US012750627B2

(12) United States Patent
Schott et al.

(10) Patent No.: US 12,750,627 B2
(45) Date of Patent: Sep. 29, 2026

(54) DETECTION OF THE CHANGE OF POSITION OF A SET-TOP BOX BY IMAGE ANALYSIS

(71) Applicant: SAGEMCOM BROADBAND SAS, Bois-Colombes (FR)

(72) Inventors: Vincent Schott, Bois-Colombes (FR); Jad Obeid, Bois-Colombes (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 0 days.

(21) Appl. No.: 18/543,755

(22) Filed: Dec. 18, 2023

(65) Prior Publication Data

US 2024/0205627 A1 Jun. 20, 2024

(30) Foreign Application Priority Data

Dec. 19, 2022 (FR) ...................................... 2213840

(51) Int. Cl.
*H04S 7/00* (2006.01)
*G06T 7/73* (2017.01)
*H04N 21/439* (2011.01)
*H04R 5/02* (2006.01)

(52) U.S. Cl.
CPC ................ *H04S 7/301* (2013.01); *G06T 7/74* (2017.01); *H04N 21/439* (2013.01); *H04R 5/02* (2013.01); *G06T 2207/20061* (2013.01); *G06T 2207/20076* (2013.01); *H04S 2400/11* (2013.01); *H04S 2400/13* (2013.01); *H04S 2420/11* (2013.01)

(58) Field of Classification Search
CPC .. H04S 7/301; H04S 2400/11; H04S 2400/13; H04S 2420/11; G06T 7/74; G06T 2207/20061; G06T 2207/20076; H04N 21/439; H04N 7/183; H04R 5/02
USPC .......................................... 381/56, 58, 91, 92
See application file for complete search history.

(56) References Cited

U.S. PATENT DOCUMENTS

2009/0067725 A1 3/2009 Sasakawa et al.
2012/0117502 A1* 5/2012 Nguyen ................ G06F 3/0482 715/769
2013/0329921 A1* 12/2013 Salsman ................. H04S 7/303 381/303
2015/0104050 A1* 4/2015 Harrison ................. H04S 7/301 381/303
2016/0134986 A1* 5/2016 Liu .......................... H04R 5/04 381/303
2017/0289723 A1 10/2017 Yoo et al.
(Continued)

FOREIGN PATENT DOCUMENTS

EP 3367677 A1 8/2018

*Primary Examiner* — William A Jerez Lora
(74) *Attorney, Agent, or Firm* — Muncy, Geissler, Olds & Lowe, P.C.

(57) ABSTRACT

A optimization method for a sound playback performed by a set-top box including at least one speaker, and to which at least one camera is secured. The method include the steps of: acquiring an initial image produced by the camera while the set-top box is in an initial position and in an initial orientation, the set-top box thus using initial audio parameters to optimize the sound playback; then, acquiring at least one current image; analyzing the current image and the initial image to detect a change of position and/or orientation of the set-top box; performing at least one corrective action to optimize the sound playback.

16 Claims, 6 Drawing Sheets

(56) References Cited

U.S. PATENT DOCUMENTS

| | | | |
|---|---|---|---|
| 2018/0192189 | A1 | 7/2018 | Virolainen et al. |
| 2019/0075418 | A1 | 3/2019 | Shi et al. |

* cited by examiner

DETECTION OF THE CHANGE OF POSITION OF A SET-TOP BOX BY IMAGE ANALYSIS

The invention relates to the field of set-top boxes provided with at least one speaker and one camera.

BACKGROUND OF THE INVENTION

It is considered to design set-top boxes (or STB) provided with new components to implement new functionalities.

These new components comprise, for example, one or more speakers which thus make it possible for the set-top box to playback sound signals.

In reference to FIG. 1, such a set-top box 1 is thus connected to a television 2 by a cable 3 enabling an audio/video connection. This cable 3 is, for example, an HDMI (High-Definition Multimedia Interface) cable. The set-top box 1 in this case comprises, for example, a first speaker 4*a* and a second speaker 4*b* located on each side of the set-top box 1. The speakers 4*a*, 4*b* of the set-top box 1 can implement a multichannel system by being optionally associated with other speakers of the set-top box 1, to the speakers of the television 2 or to those of one or more other pieces of audio playback equipment, such as a smart speaker or a soundbar, for example.

The set-top box 1, when it is in a "predefined" initial position and initial orientation, uses initial audio parameters such that the sound playback is optimised in an initial optimal listening position. This initial optimal listening position typically corresponds to the seated position of a user in an armchair or on a sofa, facing the television 2 and the set-top box 1, at a predefined distance from these. The initial audio parameters are, for example, defined in the factory, but could also be defined during a calibration phase performed at the time of installing the set-top box 1 at the user's home.

Yet, in service, it is highly possible that the position and/or the orientation of the set-top box 1 are modified by the user, either voluntarily or inadvertently. The initial audio parameters therefore no longer optimise the sound playback in the initial optimal listening position, although this is always used by the user. The user therefore no longer optimally benefits from the acoustical efficiency of their set-top box 1.

AIM OF THE INVENTION

The invention aims to optimise the sound playback of a set-top box in service.

SUMMARY OF THE INVENTION

In view of achieving this aim, an optimisation method for a sound playback is proposed, achieved by a set-top box which comprises at least one speaker and to which at least one camera is secured, comprising the steps of:

- acquiring at least one initial image produced by the camera, while the set-top box is in an initial position and in an initial orientation, the set-top box thus using initial audio parameters to optimise the sound playback;
- then, acquiring at least one current image produced by the camera;
- analysing the current image and the initial image to detect a change of position and/or orientation of the set-top box;

- performing at least one corrective action making it possible to optimise the sound playback following the change of position and/or orientation of the set-top box.

The processing unit therefore uses the initial image and the current image to detect a change of position and/or orientation of the set-top box. A corrective action can thus be performed to correct the effects of this movement on the acoustical efficiency of the set-top box. The user can therefore best benefit from the qualities of the set-top box, even if this has been moved voluntarily or inadvertently.

In addition, an optimisation method such as described above is proposed, wherein the analysis of the current image and of the initial image comprises the steps of:

- determining a planar homography matrix making it possible to pass from the current image to the initial image;
- analysing said planar homography matrix to detect the change of position and/or orientation of the set-top box.

In addition, an optimisation method such as described above is proposed, wherein the analysis of the planar homography matrix comprises the steps of:

- comparing said planar homography matrix with an identity matrix;
- not detecting a change of position nor orientation of the set-top box, when an absolute value of a difference between each element of the planar homography matrix and a corresponding element of the identity matrix is less than a predetermined first detection threshold;
- detecting a change of position and/or orientation of the set-top box otherwise.

In addition, an optimisation method such as described above is proposed, wherein the analysis of the current image and of the initial image comprises the steps of:

- detecting in the initial image, by using a Hough transform, a first number of first lines, each having first polar coordinates;
- detecting in the current image, by using the Hough transform, a second number of second lines, each having second polar coordinates;
- evaluating a number of lines common to the initial image and to the current image;
- detecting a change of position and/or orientation of the set-top box if the number of common lines is less than a predetermined second detection threshold.

In addition, an optimisation method such as described above is proposed, further comprising the steps of:

- calculating a confidence index which depends on the first number and on the second number;
- comparing the confidence number with a predetermined confidence threshold;
- deciding, according to a result of said comparison, to validate, or not, a result of the step of detecting the change of position and/or orientation.

In addition, an optimisation method such as described above is proposed, wherein the corrective action comprises the steps of:

- determining a new position and/or a new orientation of the set-top box;
- producing new audio parameters to optimise the sound playback, while the set-top box is in the new position and/or the new orientation.

In addition, an optimisation method such as described above is proposed, comprising the steps of:

- determining, in a system linked to the current image, coordinates of an initial optimal listening position, wherein the sound playback was optimised while the set-top box was in the initial position and the initial orientation;

producing the new audio parameters, such that the sound playback is again optimised in the initial optimal listening position.

In addition, an optimisation method such as described above is proposed, wherein the new audio parameters comprise a gain applied on a current volume, which depends on the initial optimal listening position and on the new position and/or on the new orientation of the set-top box.

In addition, an optimisation method such as described above is proposed, wherein the set-top box comprises at least two speakers, the production of the new audio parameters comprising the step of adjusting an audio balance between said at least two speakers.

In addition, an optimisation method such as described above is proposed, wherein the set-top box comprises a first speaker and a second speaker, the optimisation method comprising the steps of:

determining, by using the planar homography matrix, a first angle between a reference axis of the initial image passing through the initial optimal listening position, and a first current axis passing through the initial optimal listening position and the first speaker in the current image, and a second angle between the reference axis and a second current axis passing through the initial optimal listening position and the second speaker in the current image;

determining, by using the planar homography matrix, a first distance between the initial optimal listening position and the first speaker, and a second distance between the initial optimal listening position and the second speaker;

using an ambisonic method to place virtual sound sources around the initial optimal listening position by calculating gains which depend on the first angle, on the second angle, on the first distance and on the second distance, the new audio parameters comprising said gains.

In addition, an optimisation method such as described above is proposed, the optimisation method using, to define the new audio parameters, a predefined cross-reference table which associates precalculated audio parameters with distance and/or angle indications representative of the change of position and/or orientation of the set-top box.

In addition, an optimisation method such as described above is proposed, comprising the steps, to determine the new position of the set-top box, of:

detecting a particular angle which is the most present in the set of polar coordinates comprising the first polar coordinates of the first lines and the second polar coordinates of the second lines;

if a number of times where said particular angle is present in the set of polar coordinates is greater than a predetermined angle threshold, deducing from this that the set-top box has possibly undergone a lateral movement perpendicularly to an optical axis of the camera;

estimating said lateral movement according to the distances of the first polar coordinates of the first lines and of the second polar coordinates of the second lines having the particular angle as an angle.

In addition, an optimisation method such as described above is proposed, wherein the corrective action consists of defining a new optimal listening position associated with the new position and/or with the new orientation of the set-top box, and of indicating the new optimal listening position to the user, so that they use it.

In addition, an optimisation method such as described above is proposed, wherein the corrective action consists of emitting a message to a user of the set-top box, asking them to reposition the set-top box in the initial position and/or in the initial orientation.

In addition, a set-top box is proposed, comprising at least one speaker and to which at least one camera is secured, the set-top box further comprising a processing unit, wherein the optimisation method such as described above is implemented.

In addition, a computer program is proposed, comprising instructions which make the processing unit of the set-top box such as described above, execute the steps of the optimisation method such as described above.

In addition, a recording medium which can be read by a computer is proposed, on which the computer program such as described above is recorded.

The invention will be best understood in the light of the description below of particular, non-limiting embodiments of the invention.

BRIEF DESCRIPTION OF THE DRAWINGS

Reference will be made to the accompanying drawings, among which.

DETAILED DESCRIPTION OF THE INVENTION

Figure 1:
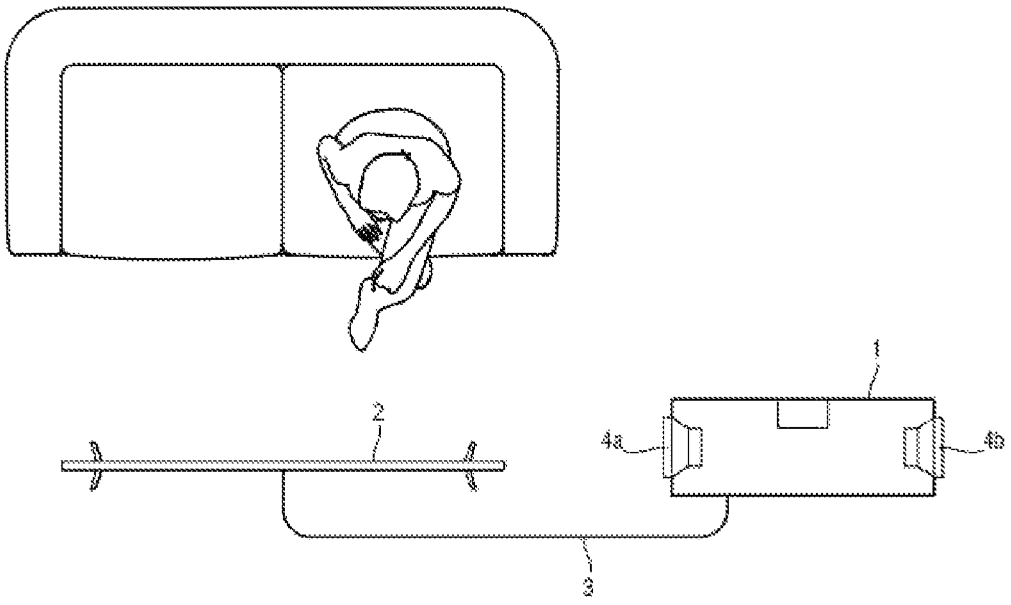
FIG. 1 is a schematic and top view representing a set-top box and a television of the prior art, as well as a user seated on a sofa.
Figure 2:
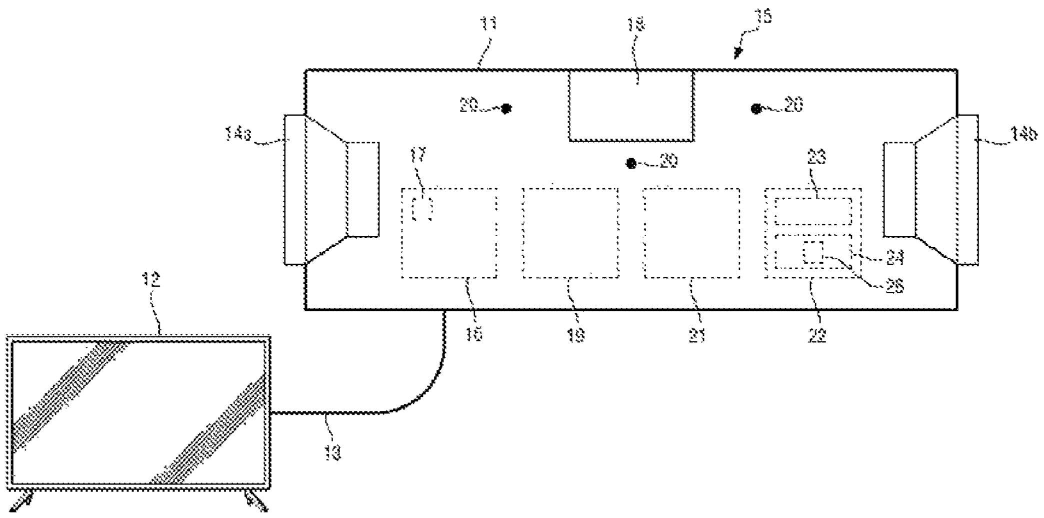
FIG. 2 represents a television and a set-top box, wherein the invention is implemented.

In reference to FIG. 1, the invention is, in this case, implemented in a system comprising a set-top box 11 and a television 12.

The set-top box 11 is connected to the television 12 by an HDMI cable 13.

The set-top box 11 comprises, in this case, two speakers 14 comprising a first speaker **14*a* and a second speaker 14*b***.

The membrane of the first speaker **14*a* is located at a left face of the set-top box 11. The membrane of the second speaker 14*b* is located at a right face of the set-top box 11**.

The set-top box 11 comprises an audio unit 16 arranged to acquire an audio stream and to produce first audio signals going to the first speaker **14*a*, and second audio signals going to the second speaker 14*b***, so as to playback sound signals corresponding to the audio stream.

The audio stream can be a single-channel or multichannel audio stream, can optionally accompany a video stream, and can come from any source, which is, for example, a broadcasting network (satellite television network, internet connection, digital terrestrial television (DTT) network, cable television network, etc.), another piece of equipment connected to the set-top box (11) (a CD, DVD or BlueRay player, a smartphone, a tablet, etc.), or also a storage medium (and, for example, a USB stick or a memory card connected to the set-top box 11).

The audio unit 16 comprises hardware components (hardware) and/or software. These components comprise in particular, one or more amplifiers. Some of these components implement an audio processing module 17 capable of applying and of modifying audio parameters to adjust the acoustical efficiency of the speakers 14*a*, 14*b*. A set of audio parameters forms an audio profile.

In particular, the audio processing module 17 makes it possible to distribute the channels of a multichannel audio stream between the speakers 14, so as to provide the spatialisation effect for the user. The audio processing module 17 can adapt the distribution, according to a position parameter of the user and to an angle defining the width of the optimal listening zone.

The set-top box 11 in addition comprises a camera 18.

The camera 18 is positioned at a central and upper portion of the front face 15 of the set-top box 11.

The set-top box 11 comprises an image processing module 19 arranged to acquire the images produced by the camera 18 and to apply signal processing algorithms on the images.

The set-top box 11 also comprises one or more microphones 20 arranged to capture sound signals present in the environment of the set-top box 11. The set-top box 11 in addition comprises an audio processing module 21 arranged to process and to record said captured sound signals.

The set-top box 11 also comprises a processing unit 22. The processing unit 22 comprises at least one processing component 23 (electronic and/or software), which is, for example, a "general-purpose" processor, a processor specialising in signal processing (or Digital DSP, Signal Processor), a microcontroller, or a programmable logic circuit, such as an FPGA (Field Programmable Gate Array) or an ASIC (Application Specific Integrated Circuit). The processing unit 22 also comprises one or more memories 24 (and, in particular, one or more non-volatile memories), connected to or integrated in the processing component 23. At least one of these memories 24 forms a recording medium which can be read by a computer, on which at least one computer program is recorded, comprising instructions which make the processing component 23 execute at least some of the steps of the optimisation method which will be described below.

The invention consists of comparing images of the scene located facing the set-top box 11 and captured at different points in time by the camera 18. This comparison aims to detect (and optionally also evaluate) movements of several objects of the scene and to deduce, from these movements, a possible change of position and/or orientation of the set-top box 11. If a change which can degrade the sound efficiency of the user is detected, a corrective action is performed.

Figure 3:
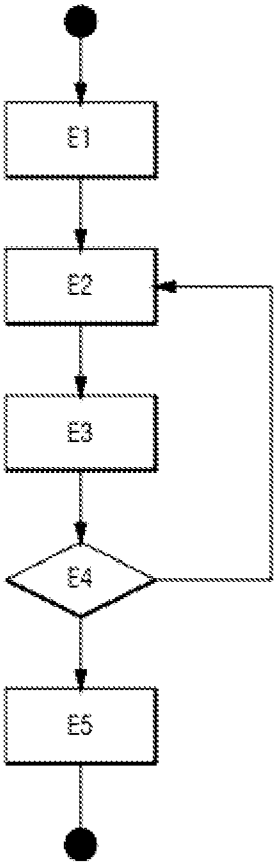
FIG. 3 represents steps of the optimisation method.

In reference to FIG. 3, the optimisation method for the sound playback performed by the set-top box 11 therefore comprises the following steps.

Figure 4:
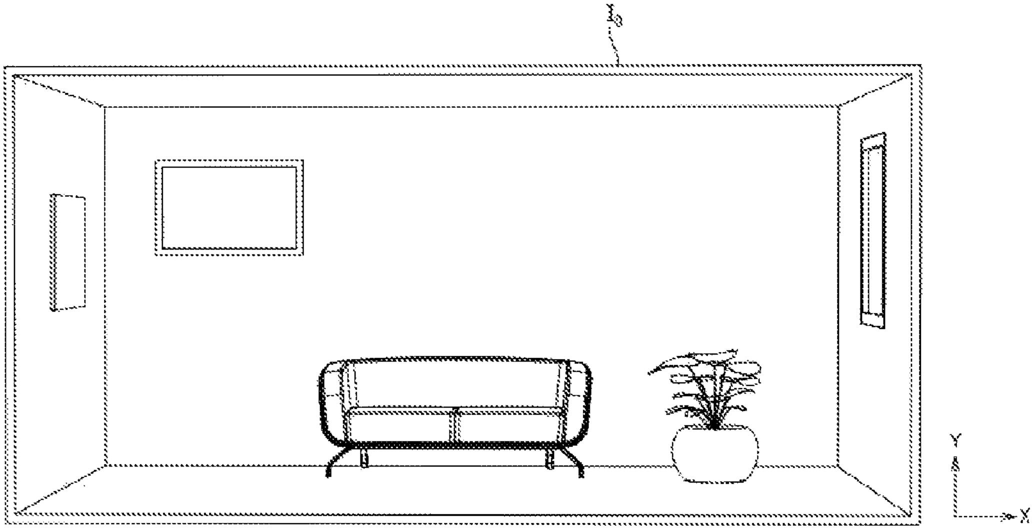
FIG. 4 represents an initial image.

The processing unit 22 acquires at least one initial image $I_0$ produced by the camera 18, while the set-top box 11 is in an initial position and in an initial orientation: step E1. The initial image $I_0$ is, for example, that of FIG. 4.

Then, the processing unit 22 acquires at least one current image $I_n$ produced by the camera 18: step E2.

The processing unit 22 thus analyses the current image $I_n$ and the initial image $I_0$ to detect a change of position and/or orientation of the set-top box 11: step E3.

The processing unit 22 thus evaluates this change of position and/or orientation: step E4. If this is not significant, and therefore has no impact on the acoustical efficiency, the method returns to step E2.

If the change of position and/or orientation is significant, the processing unit 22 performs at least one corrective action having the aim of optimising the sound playback following the change of position and/or orientation of the set-top box 11: step E5.

A first embodiment of the optimisation method is now described, in a more detailed manner.

Figure 5:
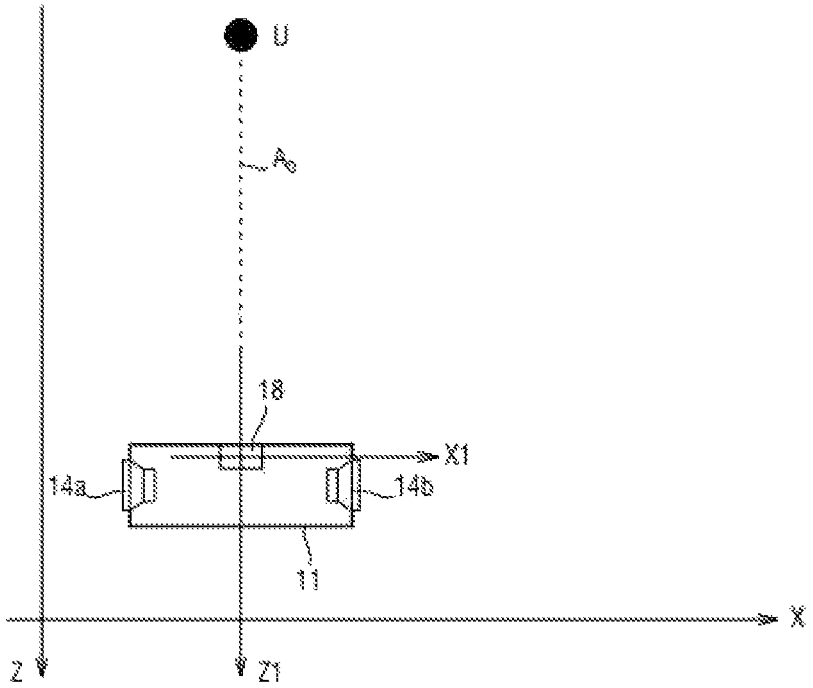
FIG. 5 represents the set-top box as a top view, as well as a reference system associated with the scene and a first system associated with the set-top box.

In step E1, the set-top box 11 is in the initial position and in the initial orientation, which are the nominal position and orientation. In reference to FIG. 5, the set-top box 11 is, for example, laid flat, such that its lower face rests on a support (a TV stand, for example). The set-top box 11 is, for example, configured such that the optical axis A, of the camera 18 passes through an initial optimal playback position U, which is the position of the user which, when the set-top box 11 is in the initial position and in the initial orientation, makes it possible for the user to best benefit form the audio playback qualities of the set-top box 11.

It is noted that in this position and in the initial image $I_0$, the axis X1 and the axis Z1 of the first system $R_1$ associated with the set-top box 11 are parallel respectively to the axis X and the axis Y of a reference system associated with the scene. The axis Z1 is, in this case, the optical axis $A_0$ of the camera 18 when the set-top box 11 is in the initial position and the initial orientation.

The processing unit 22 acquires at least one initial image $I_0$. Optionally, one or more processings, and for example, a border detection filtering and/or a colour equalisation, are applied on the initial image $I_0$ and make it possible to prepare it for the next step. This image $I_0$ is saved in the non-volatile memory.

The set-top box 11 therefore has been calibrated (for example, in the factory, or manually by the user upon its first start-up) for the initial optimal playback position U.

The U coordinates ($u_x$, $u_y$, $u_z$) in the system $R_1$ (X1, Y1, Z1) are noted. The U position is therefore known.

The result of this calibration is that the set-top box 11, from its start-up following said calibration (it is from its first start-up at the user's home if the calibration has been performed in the factory), uses initial audio parameters to optimise the sound playback. These initial audio parameters define a default sound profile. However, this adjustment makes it possible to obtain an optimised playback in the initial optimal playback position U, only when the set-top box 11 is in the initial position and in the initial orientation.

In step E2, the processing unit 22 acquires one or more current images $I_n$ (with $n \neq 0$), which are captured after the acquisition of the initial image $I_0$.

In a first embodiment, the processing unit 22 acquires a new capture of the scene (i.e. a new current image $I_n$) upon each start-up of the set-top box 11.

In a second embodiment, the processing unit 22 acquires a capture of the scene at regular intervals, for example every second, every minute or every 30 minutes.

In a third embodiment, the processing unit 22 acquires, each day, a capture of the scene at a predefined time, for example, at 12:00 pm.

The processing unit 22 can validate the capture, and therefore accept it, only if this meets one or more of the predefined criteria. For example, a capture of the scene can be considered as accepted, if the luminosity L of the scene is greater than a predetermined luminosity threshold.

For example, it is defined that the capture is accepted, if:

$$L > 1000 \text{ lux}.$$

This information is generally accessible directly on the sensor embedded in the camera 18.

In step E3, the processing unit 22 analyses the current image (s) $I_n$ and the initial image (s) $I_0$ to detect a change of position and/or orientation of the set-top box 11. This movement can be, for example, defined only by a rotation angle about the vertical axis—in which case, the movement is a change of orientation of the set-top box 11.

It is considered, for example, that the processing unit 22 analyses one single current image $I_n$ and one single initial image $I_0$.

In a first embodiment, the analysis of the current image $I_n$ and of the initial image $I_0$ consists of determining a planar homography matrix making it possible to pass from the current image $I_n$ to the initial image $I_0$, then to analyse said planar homography matrix to detect the change of position and/or orientation of the set-top box 11.

The planar homography transformation technique makes it possible to find the coordinates of a point of a map of a three-dimensional scene from the same point in another map of this same scene.

In the article entitled, *Creating Full View Panoramic Image Mosaics and Environment Maps*, Richard Szeliski and Heung-Yeung Shum, which forms part of the work, "*SIGGRAPH '97: Proceedings of the 24th annual conference on Computer graphics and interactive techniques", ISBN* 978-0-89791-896-1, which appeared on 3 Aug. 1997, on pages 251-258, and which deals with the transformation of images to obtain a panorama, the transformation matrix M with 8 coefficients ($m_0 \ldots m_7$) is described, making it possible to pass from an image 1 to an image 2, each being a photograph of one same scene with different viewpoints. The matrix M is a planar homography matrix.

It is noted that the matrix M can be broken down according to the method described in the document, *Decomposition of Homogenous* 4×4 *Matrices*, Rammi (rammi@caff.de), Apr. 14, 2020.

This breaking down makes it possible to express the matrix M as follows:

$$M = P * T * R * H * S$$

where P is a projection matrix, T is a translation matrix, R is a rotation matrix, H is a shearing matrix and S is a scaling matrix.

For a point P1(x, y, 1) and P2(x', y', 1) of homogeneous coordinates, the matrix M is written:

$$P_2 \sim M \times P_1 = \begin{bmatrix} m_0 & m_1 & m_2 \\ m_3 & m_4 & m_5 \\ m_6 & m_7 & 1 \end{bmatrix} \times \begin{bmatrix} x \\ y \\ 1 \end{bmatrix}$$

The (x', y') equations are given by:

$$x' = \frac{m_0 x + m_1 y + m_2}{m_6 x + m_7 y + 1}$$

-continued $$y' = \frac{m_3 x + m_4 y + m_5}{m_6 x + m_7 y + 1}$$

If the coefficients:

$m_0$ and $m_4$ equal 1;

$m_1$, $m_2$, $m_3$, $m_6$ and $m_7$ equal 0;

then the matrix M is an identity matrix: no movement has therefore been detected.

Otherwise, where M is not an identity matrix, a movement has been detected.

To perform the analysis of the planar homography matrix M, the processing unit 22 therefore compares said planar homography matrix M with an identity matrix.

The processing unit 22 does not detect a change of position, nor orientation of the set-top box 11 when an absolute value of a difference between each element of the planar homography matrix M and a corresponding element of the identity matrix is less than a predetermined first detection threshold. The processing unit 22 detects a change of position and/or orientation of the set-top box 11 otherwise.

Indeed, movements, which are too small, of the set-top box 11, and/or objects in the environment will not have an actual impact on the quality of the sound playback. The processing unit 22 therefore adds a margin of error on the detection of an identity matrix.

In this case, the predetermined first detection thresholds are equal for all the elements of the matrix M and are, for example, equal to 1%.

The processing unit 22 does not therefore detect a change of position, nor orientation of the set-top box 11, when:

$$m_0 = 1 \pm 0.01$$
$$m_4 = 1 \pm 0.01$$
$$m_1 = 0 \pm 0.01$$
$$m_2 = 0 \pm 0.01$$
$$m_6 = 0 \pm 0.01$$
$$m_7 = 0 \pm 0.01$$

Figure 6:
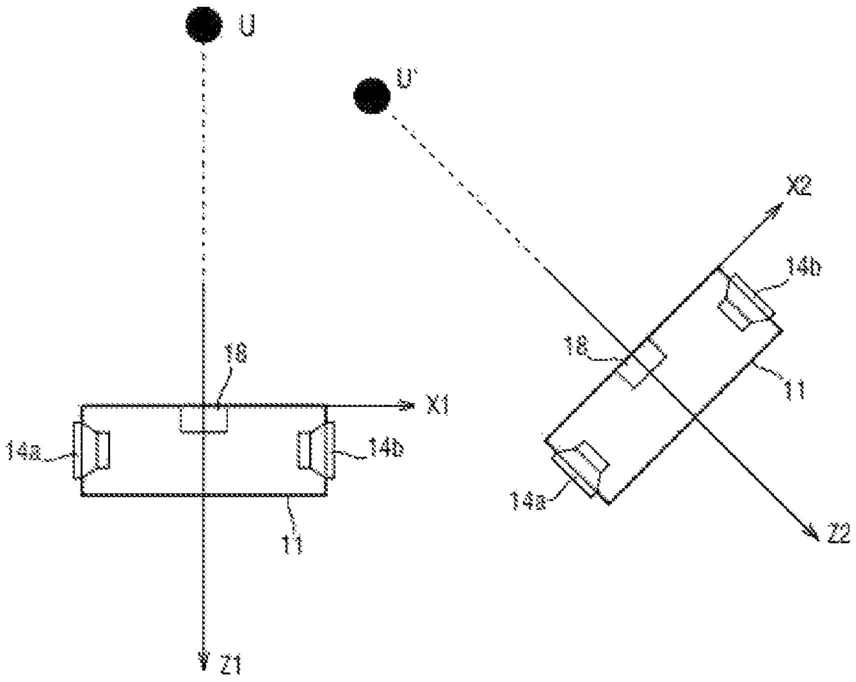
FIG. 6 is a figure similar to FIG. 5, which further represents the set-top box after its movement and a second system associated with the set-top box.

In reference to FIG. 6, the new optimal listening position becomes U'.

Applying a movement in the reference point of the scene, returns to moving the optimal audio position in the reference point of the camera 18.

In the second system $R_2$ (X2, Y2, Z2), associated with the set-top box 11 after its movement, the point U ($u_x$, $u_y$, $u_z$), i.e. the initial optimal listening position, has as coordinates those of the point U' ($u'_x$, $u'_y$, $u'_z$) transformed by the matrix M.

Therefore, in $R_2$, the following is had: U~M×U'

$$u_x = \frac{m_0 u'_x + m_1 u'_y + m_2}{m_6 u'_x + m_7 u'_y + 1}$$

$$u_y = \frac{m_3 u'_x + m_4 u'_y + m_5}{m_6 u'_x + m_7 u'_y + 1}$$

The new optimal listening position becomes U'.

Following step E4, if the movement undergone by the set-top box 11 is significant, the processing unit 22 performs, in step E5, at least one corrective action having the aim of optimising the sound playback following the change of position and/or orientation of the set-top box 11.

In a first embodiment, if the change of position and/or orientation of the set-top box 11 is detected since considered as significant, the processing unit 22 emits a message to the user of the set-top box 11 asking them to reposition the set-top box 11 in the initial position and/or in the initial orientation. The corrective action therefore consists of emitting this alert message.

The user is alerted, for example, by a message on the screen of the television 12, by a sound signal or by a light signal coming, for example, from a light-emitting diode integrated in the set-top box 11, or by a message sent by any radio means. This message asks the user to return the set-top box 11 into the initial position and/or into the initial orientation.

In a second embodiment, the processing unit 22 defines a new optimal listening position associated with the new position and/or with the new orientation of the set-top box 11. The new optimal listening position is therefore the position U' in FIG. 6.

The processing unit 22 indicates to the user of the set-top box 11 the new optimal listening position U', so that they use it.

The corrective action therefore consists of defining the new optimal listening position, and of indicating this new optimal listening position to the user.

In a third embodiment, the processing unit 22 determines the new position and/or the new orientation of the set-top box 11, and produces new audio parameters to optimise the sound playback, while the set-top box 11 is in the new position and/or the new orientation.

Generating new audio parameters can be done at the initiative of the user. The processing unit 22 proposes to the user to trigger, at their initiative, a calibration of the audio profile by automatic adjustment of the parameters.

Alternatively, the processing unit 22 performs this adjustment automatically as a background task, without intervention of the user.

Before performing the adjustment, the processing unit 22 verifies a reliability criterion on the detection of the new position and/or the new orientation of the set-top box 11.

The reliability criterion is that the value of the error, calculated to the equation (13) of the document mentioned above (*Creating Full View Panoramic Image Mosaics and Environment Maps*, Richard Szeliski and Heung-Yeung Shum), is less than (for example, less than or equal to) a predefined reliability threshold.

The error is given by:

$$e = \frac{\sum_i (L1(x'i) - L0(xi))^2}{\text{width} \times \text{height}}$$

This formula uses L0 and L1, which are the standardised intensities (between 0 and 1) of the reference image, respectively the new captured image.

Then, the sum of the squared differences of each pixel intensity "i" is calculated.

Finally, this result must be divided by the total number of pixels.

This gives the standardised overall intensity error between 0 and 1.

The following is had, if:

e is close to 0: the images are highly correlated, e is close to 1: the images have very few common points.

Indeed, if the initial image $I_0$ and the current image $I_n$ are completely uncorrelated, therefore without a common point, the processing unit 22 cannot reliably estimate the coordinates $u_x$, $u_y$ of the point U in the system $R_2$.

The predefined reliability threshold is, for example, equal to 40%.

The processing unit 22 considers that the initial image $I_0$ and the current image $I_n$ are not close enough if the error is greater than the predefined reliability threshold of 40% for example, which can be conveyed by the fact that the initial image I0 and the current image $I_n$ overlap at 60%.

In this case, the processing unit 22 does not adjust the audio parameters, but only alerts the user of the movement.

If the reliability criterion is verified, the processing unit 22 adjusts the audio parameters, such that the sound playback is again optimised in the initial optimal listening position U.

The corrective action therefore consists of adjusting the audio parameters, such that the sound playback is again optimised in the initial optimal listening position U. The automatic adjustment of the audio parameters according to the movement of the set-top box 11 can be done several ways.

The new audio parameters can comprise a gain applied onto a current volume, which depends on the initial optimal listening position U and on the new position and/or on the new orientation of the set-top box 11.

This solution is particularly suitable in the case where the set-top box 11 only comprises one single speaker (single-channel system).

The processing unit 22 adjusts the volume of the speaker by applying, for example, a gain onto the current volume which is proportional to the extension of the initial optimal listening position U with respect to the optical axis A, of the camera 18 (this extension is equal to the distance separating U from its orthogonal projection over $A_o$) or with respect to the abscissa of the new optimal listening point U'.

The translation matrix T and/or the rotation matrix R can be used to calculate the distances [OU] and [OU'] O being the origin of the second system), and make the ratio between the two distances to obtain a factor to be applied onto the current volume of the speaker.

Optionally, this gain can be limited, such that the total current volume (equal to the sum of the present current volume and of the gain), does not exceed a maximum authorised volume. This volume limit can be adjusted by the user, or be automatically levelled according to the current volume of the room captured by the microphones 20 of the set-top box 11.

The processing unit 22, to produce the new audio parameters, can also adjust an audio balance between the first speaker 14*a* and the second speaker 14*b*. This solution therefore requires at least two speakers (stereo system).

Figure 7:
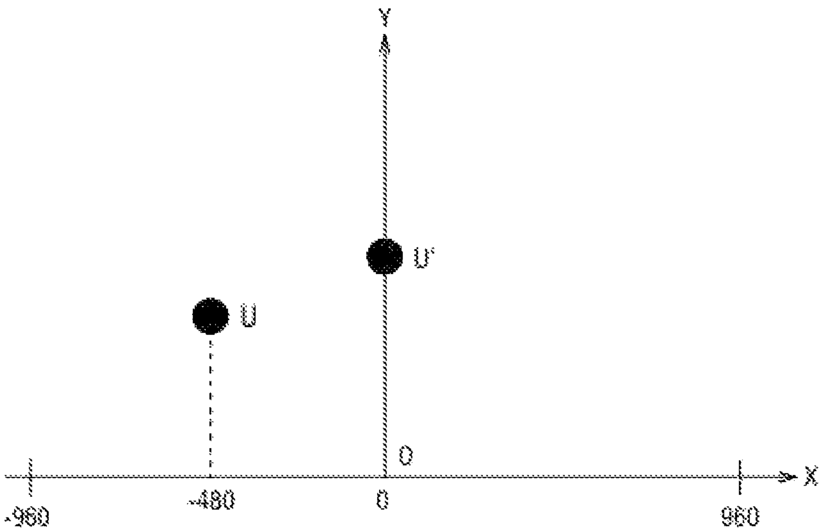
FIG. 7 illustrates an audio balance adjustment.

In reference to FIG. 7, which represents the plane (XY) of the camera 18, the processing unit 22 adjusts the balances of the sound between the first speaker 14*a* and the second speaker 14*b*, and therefore generates sound signals with more sound amplitude to the left or to the right. The image of FIG. 7 is an HD image with 1920 pixels by width and 1080 pixels by height. The optical axis $A_o$ (in the new position) is at the centre and has the coordinates (0, 0) in the plane (XY).

The processing unit 22 adjusts the balances according to the position of U in the current image $I_n$ and, more specifically, according to the position of U with respect to the axis OY.

In FIG. 7, it is seen that the point U has the coordinates −480 pixels to the left of the axis OY. The processing unit 22 therefore increases the volume of the second speaker 14*b* (located on the right) to consider the extension of the second speaker 14*b* with respect to the optimal listening zone.

The increasing of the volume depends, in this case, on the extension of the point U with respect to the axis OY. In this case, for example, the processing unit 22 increases the volume of the speaker farthest from U, by a ratio equal to the ratio between the distance between U and the axis OY and the length of the half-image defined on the side of the axis OY where the point U is positioned.

In this case, the point U is located halfway (50%) from the current half-image located on the left of the axis OY, and the processing unit 22 increases the volume of the second speaker 14*b* by 50%.

In a multichannel system (two speakers or more), the processing unit 22 can use a so-called "ambisonic" spatialisation technique.

Figure 8:
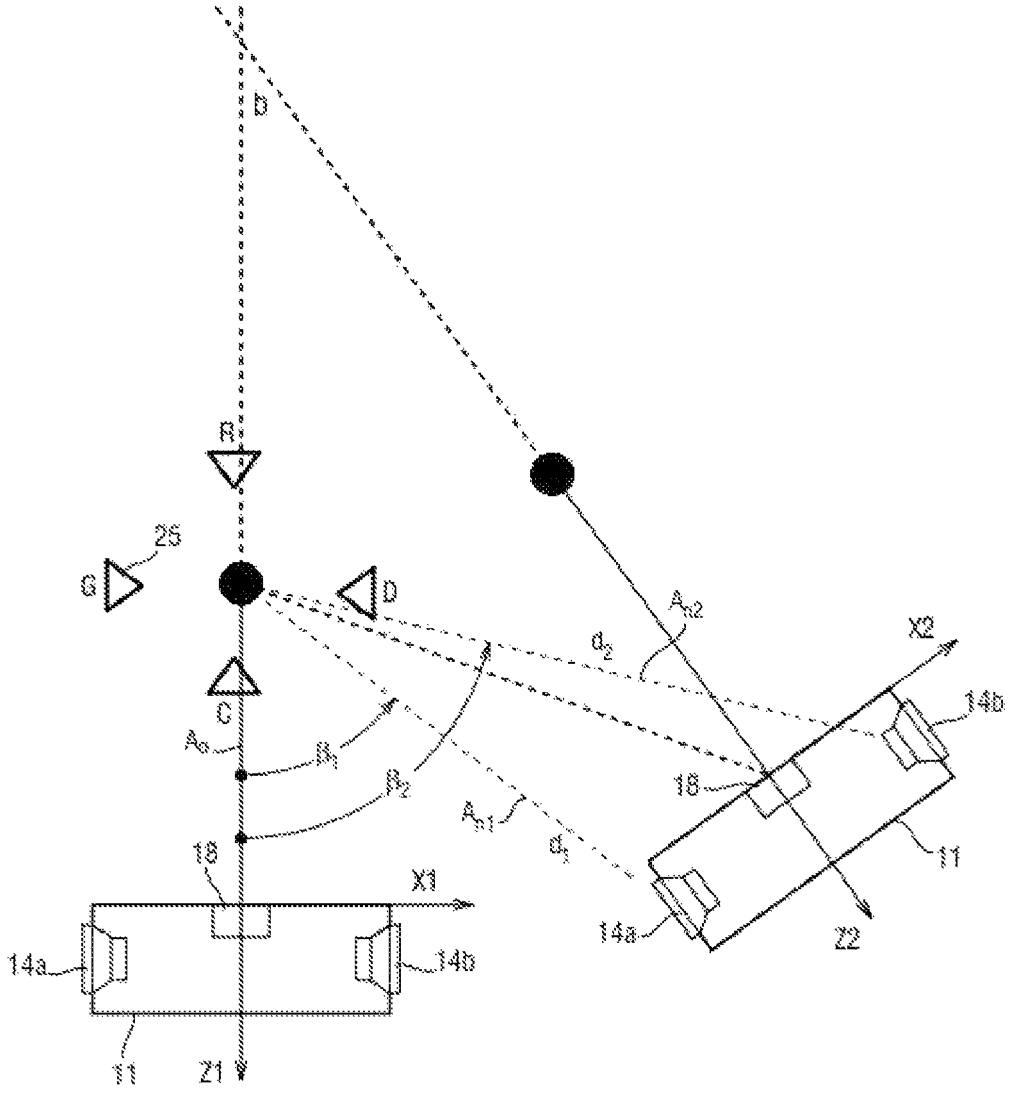
FIG. 8 is a figure similar to FIG. 6, which illustrates the ambisonic method.

In reference to FIG. 8, this method makes it possible to place virtual sound sources around a listener by calculating gains $G_{ij}$ for each speaker i and each source j according to the position of the listener with respect to the speakers, and to the desired position for the virtual source. It is noted that the gains $G_{ij}$ are complex values, which therefore represent the combination of an amplification (or of an attenuation) and of a phase shift.

According to this embodiment, it is considered that the virtual sources do not change position after the movement of the set-top box 11.

The processing unit 22 first determines, by using the planar homography matrix M, a first angle $\beta_1$ between a reference axis of the initial image $I_0$ passing through the initial optimal listening position U, and a first current axis $A_{n1}$ passing through the initial optimal listening position U and the first speaker 14*a* in the current image $I_n$, and a second angle $\beta_2$ between the reference axis and a second current axis $A_{n2}$ passing through the initial optimal listening position U and the second speaker 14*b* in the current image $I_n$.

The reference axis is, in this case, the optical axis $A_o$ of the camera 18, which passes through the initial optimal listening position U and through the position of the camera 18 on the set-top box 11, when this is in the initial position and in the initial orientation.

The processing unit 22 also determines, by using the planar homography matrix M, a first distance $d_1$ between the initial optimal listening position U and the first speaker 14*a*, and a second distance $d_2$ between the initial optimal listening position U and the second speaker 14*b*.

The processing unit 22 uses the ambisonic method to place virtual sound sources 25 around the initial optimal listening position U, by calculating gains which depend on the first angle $\beta_1$, on the second angle $\beta_2$, on the first distance $d_1$ and on the second distance $d_2$, the new audio parameters comprising said gains.

The ambisonic method therefore requires to determine the values ($d_1$, $\beta_1$) and ($d_2$, $\beta_2$), $d_1$ being the first distance, $\beta_1$ being the first angle, $d_2$ being the second distance and $\beta_2$ being the second angle.

This method requires to define the initial position and initial orientation of the set-top box 11 in the initial system (before its movement).

In FIG. 8, the rotation angle b is obtained after breaking down the matrix M. The distance and the angle ($d_1$, $\beta_1$) between the point U and the first speaker 14*a*, and the distance and the angle ($d_2$, $\beta_2$) between the point U and the second speaker 14*b*, are obtained after having determined the position of the set-top box 11 in the system (X1, Z1).

The processing unit 22 is thus capable, by using the ambisonic method, of finding the gains to be applied onto each speaker 14*a*, 14*b* to reconstitute four virtual sources 25: the source C positioned at the centre in front of the user, the source G on the left, the source D on the right and the source R behind the user.

It is noted that in FIG. 8, the speakers 14 are not at an equal distance from the user, which can pose a problem for the ambisonic method. To resolve this problem, a gain $G_{ij}$ (d) is calculated for each speaker 14, for values of distance d varying between the first distance de and the second distance $d_2$, and then the average of these values $\underline{G}_{ij}$ is applied:

$$\underline{G}_{LC} \times C + \underline{G}_{LD} \times D + \underline{G}_{LG} \times G + \underline{G}_{LR} \times R \text{ on the first speaker (on the left);} \quad \text{14a}$$

$$\underline{G}_{RC} \times C + \underline{G}_{RD} \times D + \underline{G}_{RG} \times G + \underline{G}_{RR} \times R \text{ on the second speaker (on the right).} \quad \text{14b}$$

In this case, C, D, G and R represent the audio signals emitted by the respective virtual sources.

To define the new audio parameters, the processing unit 22 can use a predefined cross-reference table 26 which associates precalculated audio parameters with distance and/or angle indications representative of the change of position and/or orientation of the set-top box 11. This predefined cross-reference table 26, is, for example, stored in one of the non-volatile memories.

The predefined cross-reference table 26 comprises, for example, a plurality of triplets of values ($\Delta_x$, $\Delta_z$, $\Delta_\theta$) and parameters $G_{i,j}$, each triplet of values ($\Delta_x$, $\Delta_z$, $\Delta_\theta$) being associated with a set of values of gains $G_{i,j}$.

($\Delta_x$, $\Delta_z$) represents a distance unit step in the system (X1, Z1), equal to 50 cm for example (this value corresponds to a distance before projection of the matrix P).

$\Delta\theta$ represents an angle step about the axis Y, equal to 15° for example (this value comes from the rotation matrix R).

Now, a second embodiment of the sound playback optimisation method is described.

Figure 9:
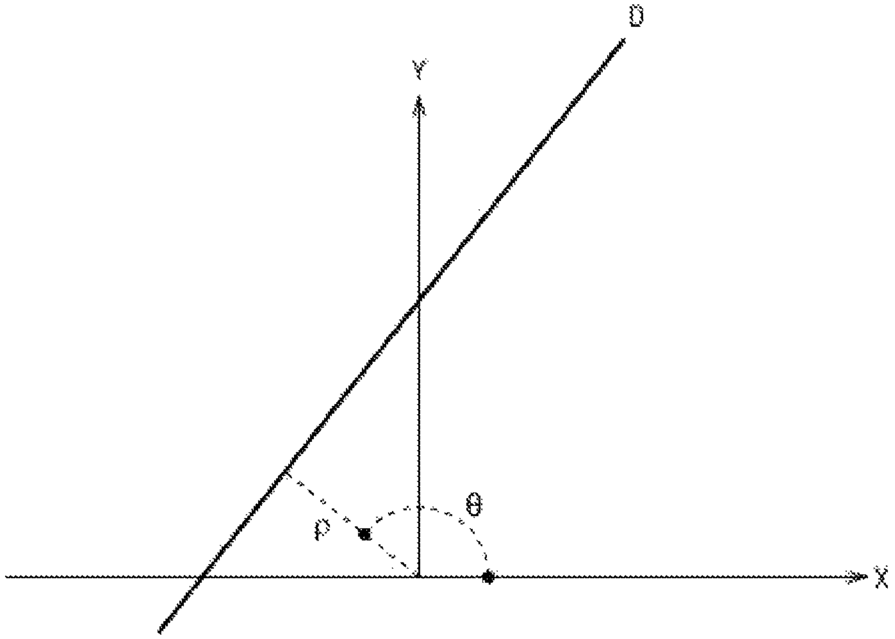
FIG. 9 is a graph representing a straight line and its polar coordinates.

This embodiment uses an algorithm for detecting lines formed by the objects of the scene photographed by the camera 18. In reference to FIG. 9, the output of the Hough transform makes it possible to obtain a family of straight lines, each straight line D having polar coordinates ($\rho$, $\theta$) in the plane (XY) of the camera 18. The origin is the position of the camera 18.

Again, FIG. 3 (method) is referred to.

In step E1, the processing unit 22 acquires the initial image $I_0$.

In step E2, the processing unit 22 acquires the current image $I_n$.

Figure 10:
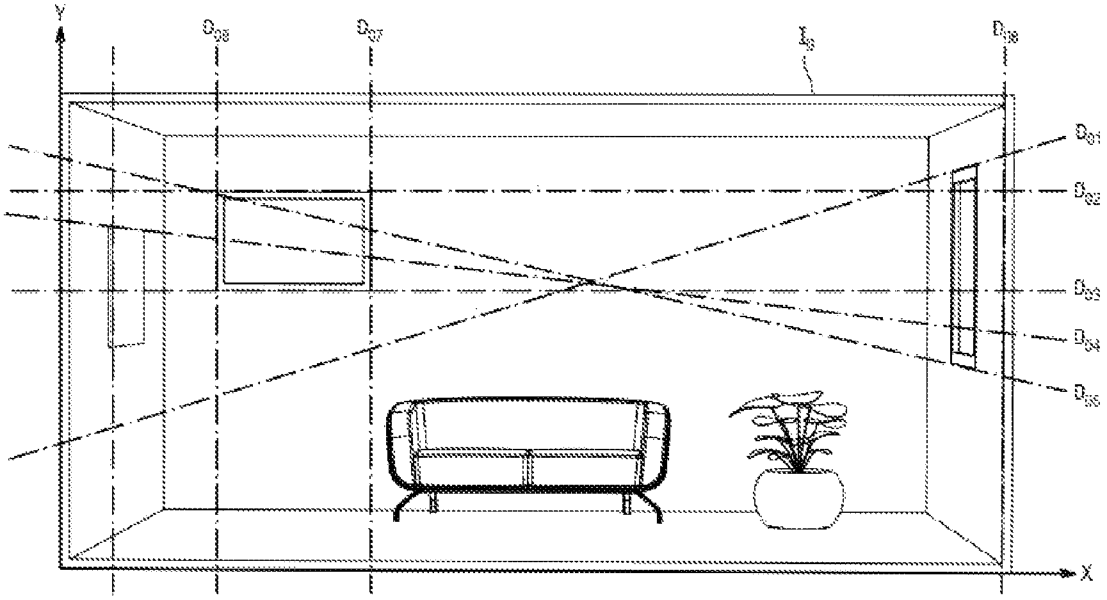
FIG. 10 represents the initial image and first lines detected by the Hough transform.

In step E3, and in reference to FIG. 10, the processing unit 22 detects in the initial image $I_0$, by using a Hough transform, a first number of first lines $D_{0i}$ each having first polar coordinates (i varies from 1 to 8 in FIG. 10).

The polar coordinates of each first line $D_{0i}$ are saved in a first database $B_0$ stored, for example, in one of the non-volatile memories (in order to be returned later). For example, if a straight line $D_{01}$ is defined by the coordinates $(\rho_{01}, \theta_{01})$, the first database $B_0$ will comprise the association:

$$D_{01}: (\rho_{01}, \theta_{01})$$

More generally, for each straight line $D_{0i}$ of the image $I_0$, the database will comprise the association:

$$D_{01}: (\rho_{01}, \theta_{01})$$

Optionally, only the straight lines with vertical orientation can be considered, and for example those of which the angle $\theta$ is comprised in a predefined interval, which is, for example, the interval $$\left[0; \frac{\pi}{4}\right] \; ou \; \left[\frac{3\pi}{4}; \pi\right].$$

The processing unit 22 thus only detects the translations on the abscissa axis and the rotations about the ordinate axis. In this way, the calculations are simplified, without degrading the detection, as this interval corresponds to the majority of cases of use. Indeed, it can be considered that the set-top box 11 is itself horizontally aligned and positioned on a flat surface.

Then, the processing unit 22 detects in the current image $I_n$, by using the Hough transform, a second number of second lines each having second polar coordinates.

The processing unit 22 applies for each current image $I_n$ the same algorithm as that described for the initial image $I_0$.

The processing unit 22 thus produces a second database $B_1$, formed by straight lines:

$$D_{11}: (\rho_{11}, \theta_{11}).$$

The processing unit 22 thus evaluates a number of lines common to the initial image $I_0$ and to the current image $I_n$.

The comparison between the initial image $I_0$ and the current image $I_n$ is made by counting the number of lines which are common to the two images by using the following algorithm.

In this case:

N is the first number of first lines in the first database $B_0$;

M is the second number of second lines in the second database $B_1$;

L is the number of lines counted as identical between the first lines of the first database $B_0$ and the second lines of the second database $B_1$.

The algorithm is as follows:

```
1   L = 0
2   for k from 0 to M − 1
3     for r from 0 to N − 1
4       if (rho_b0[r] = rho_b1[k] and theta_b0[r] =
theta_b1[k]) then
5         L = L + 1
6       end if
7     end for
8   end for
```

The processing unit 22 detects a change of position and/or orientation of the set-top box 11 if the ratio of the number of common lines and of the total number of lines is less than a predetermined detection threshold.

The predetermined detection threshold is, for example, equal to 70%: the set-top box 11 is considered as having undergone a movement if L/L max, with L max=min(N,M), is less than 0.7. Step E5 can then be triggered. Otherwise, the method returns to step E2. The second database $B_1$ can then be reset, and a new cycle restarts.

It is noted that optionally, a tolerance T $(T_\rho, T_\theta)$ can be introduced for the coordinates of the straight lines, in order to avoid detecting movements of the set-top box 11 which are too small and therefore not having an actual impact on the audio efficiency. Each equality test in line 4 above would become, for example:

```
4     if (rho_b0[r] >= (rho_b1[k] − T_rho) and rho_b0[r] <=
(rho_b1[k] + T_rho) and
        theta_b0[r] >= (theta_b1[k]− T_theta) and theta_b0[r]
   <= (theta_b1[k] + T_theta)) then
5         L = L + 1
6     end if
```

The pair of values $(T_\rho, T_\theta)$ can be:

- a pair of fixed values: for example, 50 pixels for $T_\rho$, 1 degree for $T_\theta$;

or a percentage of the total size of the width or height of the image, for example 5% of the size of the image $I_n$:

$$T_\rho = 5 \times \frac{\text{width } I_n}{100 \times \cos\theta} \text{ or } T_\rho = 5 \times \frac{\text{height } I_n}{100 \times \sin\theta}$$

It can happen that L is not representative, as it lacks systems in the image $I_0$ or $I_n$ making it possible to calculate enough straight lines.

The processing unit 22 therefore calculates a confidence index making it possible to estimate a confidence in the result of the detection, then compares the confidence index with a predetermined confidence threshold. The processing unit 22 then decides, according to the result of said comparison, to validate, or not, the result of the step of detecting the change of position and/or orientation.

The confidence index, in this case, depends on the first number N and on the second number M.

The confidence index is, in this case:

$$F = \frac{|N - M|}{N + M}$$

F is therefore the standardised difference between the first number and the second number.

The more F extends to 0, the more reliable the detection will be.

The processing unit 22 considers that the result of the detection step is reliable, only if:

$$F < U,$$

where U is the predetermined confidence threshold.

For example, the following is fixed: U=0.2.

The movement of the set-top box 11 is therefore representative of the number of lines L counted as identical.

The processing unit 22 uses this confidence index, only if N>2 and M>2. If one of these numbers is less than or equal to 1, the processing unit 22 considers that the detection is not reliable without even calculating the value of F.

If the processing unit 22 does not validate the step of detecting the change of position and/or orientation, the processing unit 22 acquires a new current image and repeats the steps which have just been described.

The use of the Hough transform also makes it possible to proceed with a calculation of the effective movement of the set-top box 11.

The processing unit 22 compares the first database $B_0$ and the second database $B_1$. For all the lines present in the first database $B_0$ and the second database $B_1$, the processing unit 22 counts the number of identical angles θ whatever the (normal) distances ρ. Two identical angles are considered if their tangents are identical or close to near 0.001, for example. The processing unit 22 detects a particular angle which is the most present in the set of polar coordinates comprising the first polar coordinates of the first lines (first database $B_0$) and the second polar coordinates of the second lines (second database $B_1$).

$\Theta_{max}$ is called the particular angle which is the most represented in the first database $B_0$ and the second database $B_1$.

If the number of times, where said particular angle is present in the set of polar coordinates, is greater than a predetermined angle threshold, the processing unit 22 deduces from this that the set-top box 11 has undergone a lateral movement perpendicular to the optical axis $A_o$ of the camera 18. More specifically, if the number of occurrences of lines oriented by $\theta_{max}$ is greater than the predetermined angle threshold, for example equal to 80% of the total number of different angles referenced in the two bases $B_0$, $B_1$, the processing unit 22 deduces from this that the set-top box 11 has been translated over the horizontal plane of the optical axis $A_o$ of the camera 18.

The processing unit 22 then estimates said lateral movement according to the distances of the first polar coordinates of the first lines and of the second polar coordinates, the second lines having the particular angle as the angle.

For the set of straight lines $\{D_{0i}, D_{1i}\}$ for which the angle is identical and the most represented (angle equal to $\theta_{max}$), the average lateral movement in pixels is thus represented in the form:

$$D_{ave}(\theta) = \frac{\left(\sum_{i=0}^{M-1} \rho_{1i}(\theta)\right) - \left(\sum_{i=0}^{N-1} \rho_{0i}(\theta)\right)}{N+M}$$

If $D_{ave}>0$, the processing unit 22 deduces from this that the movement of the set-top box 11 is done to the left with respect to its initial position in the scene S.

If $D_{ave}<0$, the processing unit 22 deduces from this that the movement of the set-top box 11 is done to the right with respect to its initial position in the scene S.

If $D_{ave}\approx 0$, the processing unit 22 deduces from this that the set-top box 22 has not been moved laterally.

The processing unit 22 thus detects that the set-top box 11 has been moved. The corrective action thus consists of emitting the alert message to alert the user of the movement.

It is noted that, once the analysis of the current image and of the initial image has made it possible to detect a change of position and/or orientation of the set-top box 11, and once the corrective action has been performed, a new cycle starts, to detect a subsequent change of position and/or orientation.

The optimisation method restarts.

The current image $I_n$ becomes the new initial image $I_0$, and the new audio parameters become the initial audio parameters. The set-top box acquires at least one new current image, then analyses the new current image and the new initial image to detect the subsequent change of position and/or orientation of the set-top box.

Naturally, the invention is not limited to the embodiments described, but includes any variant entering into the field of the invention such as defined by the claims.

The different steps of the optimisation method are not necessarily all implemented in the set-top box. All or some of these steps could be implemented in one or more different pieces of equipment, and for example remotely, on the cloud.

Although it has been indicated in this case that the camera is positioned at a central and upper portion of the front face of the set-top box, this configuration is not limiting. The camera could be eccentric. Likewise, the set-top box can be of any shape. The set-top box could have an asymmetrical geometric shape, or also circular or spherical.

The camera is not necessarily integrated in the set-top box, but must be secured to it (i.e. that it undergoes the same movements); it could, for example, be mounted on a support fixed on the upper face of the set-top box.

In this case, a set-top box is described, comprising two speakers located on the sides of it. The invention naturally is applied to different configurations, and for example, to set-top boxes comprising one single speaker, or to set-top boxes comprising four speakers, among which a low-frequency speaker is located, the membrane of which opens out to a lower or upper face of the set-top box. It is noted that, in the configuration where the set-top box integrates such a low-frequency speaker, this is not concerned by the adjustment of the balance and, more generally, of the audio parameters.

The invention claimed is:

1. An optimization method for a sound playback performed by a set-top box which comprises at least one speaker and to which at least one camera is secured, comprising the steps of:

acquiring at least one initial image produced by the camera while the set-top box is located in an initial position and in an initial orientation, the set-top box thus using initial audio parameters to optimize the sound playback;

then, acquiring at least one current image produced by the camera;

analyzing the at least one current image and the at least one initial image to detect a change of position and/or orientation of the set-top box;

performing at least one corrective action making it possible to optimize the sound playback following the change of position and/or orientation of the set-top box.

2. The optimization method according to claim 1, wherein the analysis of the at least one current image and of the at least one initial image comprises the steps of:

determining a planar homography matrix making it possible to pass from the at least one current image to the at least one initial image;

analyzing said planar homography matrix to detect the change of position and/or orientation of the set-top box.

3. The optimization method according to claim 2, wherein the analysis of the planar homography matrix comprises the steps of:

comparing said planar homography matrix with an identity matrix;

not detecting a change of position, nor orientation of the set-top box when an absolute value of a difference between each element of the planar homography matrix and a corresponding element of the identity matrix is less than a predetermined first detection threshold;

detecting a change of position and/or orientation of the set-top box otherwise.

4. The optimization method according to claim 1, wherein the analysis of the at least one current image and of the at least one initial image comprises the steps of:

detecting in the at least one initial image, by using a Hough transform, a first number of first lines each having first polar coordinates;

detecting in the at least one current image, by using the Hough transform, a second number of second lines each having second polar coordinates;

evaluating a number of lines common to the at least one initial image and to the at least one current image;

detecting a change of position and/or orientation of the set-top box if the number of common lines is less than a predetermined second detection threshold.

5. The optimization method according to claim 4, further comprising the steps of:

calculating a confidence index which depends on the first number and on the second number;

comparing the confidence index with a predetermined confidence threshold;

deciding, according to a result of said comparison, to validate or not, a result of the step of detecting the change of position and/or orientation.

6. The optimization method according to claim 1, wherein the corrective action comprises the steps of:

determining a new position and/or a new orientation of the set-top box;

producing new audio parameters to optimize the sound playback, while the set-top box is in the new position and/or the new orientation.

7. The optimization method according to claim 6, comprising the steps of:

determining, in a system linked to the at least one current image, coordinates of an initial optimal listening position, wherein the sound playback was optimized, while the set-top box was in the initial position and the initial orientation;

producing the new audio parameters, such that the sound playback is again optimized in the initial optimal listening position.

8. The optimization method according to claim 7, wherein the new audio parameters comprise a gain applied onto a current volume, which depends on the initial optimal listening position and on the new position and/or on the new orientation of the set-top box.

9. The optimization Optimisation method according to claim 7, wherein the set-top box comprises at least two speakers, the production of new audio parameters comprising the step of adjusting an audio balance between said at least two speakers.

10. The optimization method according to claim 2, wherein the corrective action comprises the steps of:

determining a new position and/or a new orientation of the set-top box;

producing new audio parameters to optimize the sound playback, while the set-top box is in the new position and/or the new orientation, determining, in a system linked to the at least one current image, coordinates of an initial optimal listening position, wherein the sound playback was optimized, while the set-top box was in the initial position and the initial orientation;

producing the new audio parameters, such that the sound playback is again optimized in the initial optimal listening position, wherein the set-top box comprises a first speaker and a second speaker, the optimization method comprising the steps of:

determining, by using the planar homography matrix, a first angle between a reference axis of the at least one initial image passing through the initial optimal listening position, and a first current axis passing through the initial optimal listening position and the first speaker in the at least one current image, and a second angle between the reference axis and a second current axis passing through the initial optimal listening position and the second speaker in the at least one current image;

determining, by using the planar homography matrix, a first distance between the initial optimal listening position and the first speaker, and a second distance between the initial optimal listening position and the second speaker;

using an ambisonic method for placing virtual sound sources around the initial optimal listening position by calculating gains which depend on the first angle, on the second angle, on the first distance and on the second distance, the new audio parameters comprising said gains.

11. The optimization method according to claim 10, using, to define the new audio parameters, a predefined cross-reference table which associates precalculated audio parameters with distance and/or angle indications representative of the change of position and/or orientation of the set-top box.

12. The optimization method according to claim 4, wherein the corrective action comprises the steps of:

determining a new position and/or a new orientation of the set-top box;

producing new audio parameters to optimize the sound playback, while the set-top box is in the new position and/or the new orientation, the method comprising the steps, to determine the new position of the set-top box, of:

detecting a particular angle which is the most present in the set of polar coordinates comprising the first polar coordinates of the first lines and the second polar coordinates of the second lines;

if a number of times where said particular angle is present in the set of polar coordinates is greater than a predetermined angle threshold, deducing from this that the set-top box has possibly undergone a lateral movement perpendicularly to an optical axis of the camera;

estimating said lateral movement according to the distances of the first polar coordinates of the first lines and of the second polar coordinates of the second lines having the particular angle as the angle.

13. The optimization method according to claim 6, wherein the corrective action consists of defining a new optimal listening position associated with the new position and/or with the new orientation of the set-top box, and of indicating the new optimal listening position to a user, so that they use it.

14. The optimization method according to claim 1, wherein the corrective action consists of emitting a message to a user of the set-top box, asking them to reposition the set-top box in the initial position and/or in the initial orientation.

15. A set-top box comprising at least one speaker and to which at least one camera is secured, the set-top box further comprising a processing unit, wherein the optimization method according to claim 1 is implemented.

16. A non-transitory recording medium which can be read by a computer, on which a computer program is recorded, wherein the computer program comprising instructions which make the processing unit of the set-top box according to claim 15 execute the steps of the optimization method.

* * * * *